United States Patent
Pratt et al.

(10) Patent No.: US 10,599,565 B2
(45) Date of Patent: Mar. 24, 2020

(54) HYPERVISOR MANAGING MEMORY ADDRESSED ABOVE FOUR GIGABYTES

(71) Applicant: HEWLETT-PACKARD DEVELOPMENT COMPANY, L.P., Spring, TX (US)

(72) Inventors: Ian Pratt, Cambridge (GB); Christian Limpach, Cupertino, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 656 days.

(21) Appl. No.: 14/140,438

(22) Filed: Dec. 24, 2013

(65) Prior Publication Data

US 2015/0178198 A1 Jun. 25, 2015

(51) Int. Cl.
*G06F 12/08* (2016.01)
*G06F 12/02* (2006.01)
*G06F 9/44* (2018.01)
*G06F 9/455* (2018.01)

(52) U.S. Cl.
CPC .......... *G06F 12/08* (2013.01); *G06F 9/44* (2013.01); *G06F 9/45558* (2013.01); *G06F 12/0223* (2013.01); *G06F 2009/45583* (2013.01); *G06F 2009/45587* (2013.01); *G06F 2212/652* (2013.01)

(58) Field of Classification Search
None
See application file for complete search history.

(56) References Cited

U.S. PATENT DOCUMENTS

| | | |
|---|---|---|
| 6,948,044 B1 | 9/2005 | Chandrasekaran |
| 7,171,523 B2 | 1/2007 | Yamasaki |
| 7,478,388 B1 * | 1/2009 | Chen ............... G06F 9/45554 718/1 |
| 8,146,084 B1 | 3/2012 | Meketa |
| 8,346,727 B1 | 1/2013 | Chester et al. |
| 8,370,838 B1 * | 2/2013 | Omelyanchuk et al. ...... 718/1 |
| 8,543,641 B2 | 9/2013 | Cherukuri et al. |
| 2004/0128670 A1 | 7/2004 | Robinson et al. |
| 2005/0149726 A1 | 7/2005 | Joshi et al. |
| 2006/0070065 A1 * | 3/2006 | Zimmer et al. ............... 718/1 |

(Continued)

FOREIGN PATENT DOCUMENTS

WO 2008073618 A2 6/2008

OTHER PUBLICATIONS

Bright, Peter, "Ten years of Windows XP: how longevity became a curse", Oct. 25, 2011, Ars Technica, "http://arstechnica.com/information-technology/2011/10/ten-years-of-windows-xp-how-longevity-became-a-curse/".*

*Primary Examiner* — Jared I Rutz
*Assistant Examiner* — Stephanie Wu
(74) *Attorney, Agent, or Firm* — HPI Patent Department (57) ABSTRACT

Approaches for performing memory management by a hypervisor. A host operating system and a hypervisor are executed on a device. The host operating system is not configured to access physical memory addressed above four gigabytes. The hypervisor manages memory for a device, including memory addressed above four gigabytes. When the hypervisor instantiates a virtual machine, the hypervisor may allocate memory pages for the newly instantiated virtual machine by preferentially using any unassigned memory addressed above four gigabytes before using memory allocated from the host (and hence addressed below four gigabytes).

15 Claims, 3 Drawing Sheets

(56) References Cited

U.S. PATENT DOCUMENTS

| | | |
|---|---|---|
| 2006/0101189 A1 | 5/2006 | Chandrasekaran et al. |
| 2006/0136910 A1 | 6/2006 | Brickell et al. |
| 2006/0143617 A1 | 6/2006 | Knauerhase et al. |
| 2006/0184937 A1 | 8/2006 | Abels et al. |
| 2006/0288343 A1 | 12/2006 | Pallister |
| 2007/0180450 A1 | 8/2007 | Croft et al. |
| 2007/0192329 A1 | 8/2007 | Croft et al. |
| 2008/0001958 A1 | 1/2008 | Vembu et al. |
| 2008/0229053 A1* | 9/2008 | Campini et al. ............... 711/203 |
| 2009/0007242 A1 | 1/2009 | Subramanian et al. |
| 2009/0119541 A1 | 5/2009 | Inoue et al. |
| 2009/0165133 A1 | 6/2009 | Hwang et al. |
| 2009/0172820 A1 | 7/2009 | Watson |
| 2009/0249472 A1 | 10/2009 | Litvin et al. |
| 2009/0276783 A1 | 11/2009 | Johnson et al. |
| 2009/0313620 A1 | 12/2009 | Sedukhin et al. |
| 2009/0328033 A1 | 12/2009 | Kohavi et al. |
| 2010/0122343 A1 | 5/2010 | Ghosh et al. |
| 2010/0235831 A1 | 9/2010 | Dittmer |
| 2011/0035494 A1 | 2/2011 | Pandey et al. |
| 2011/0173251 A1 | 7/2011 | Sandhu et al. |
| 2011/0296487 A1 | 12/2011 | Walsh |
| 2011/0302577 A1 | 12/2011 | Reuther et al. |
| 2012/0089666 A1 | 4/2012 | Goswami et al. |
| 2013/0346719 A1* | 12/2013 | Tomlinson et al. ........... 711/165 |

\* cited by examiner

HYPERVISOR MANAGING MEMORY ADDRESSED ABOVE FOUR GIGABYTES

RELATED APPLICATION DATA

This application is related to U.S. patent application Ser. No. 13/115,354, filed on May 25, 2011, entitled "Approaches for Securing an Endpoint Using Fine-Grained operation System Visualization," invented by Gaurav Banga et al., the disclosure of which is hereby incorporated by reference in its entirety for all purposes as if fully set forth herein.

This application is related to U.S. patent application Ser. No. 13/526,755, filed on Jun. 19, 2012, entitled "Ensuring the Privacy and Integrity of a Hypervisor," invented by Ian Pratt, the disclosure of which is hereby incorporated by reference in its entirety for all purposes as if fully set forth herein.

This application is related to U.S. patent application Ser. No. 13/526,769, filed on Jun. 19, 2012, entitled "Securing a Controller of a Device from a Host Operating System, invented by Ian Pratt, the disclosure of which is hereby incorporated by reference in its entirety for all purposes as if fully set forth herein.

FIELD OF THE INVENTION

Embodiments of the invention relate to memory management by a hypervisor.

BACKGROUND

Certain 32 bit operating systems, such as Microsoft Windows 7, are unable to access memory addressed above 4 gigabytes (GB). This limitation of certain operating systems stems from the inability of a 32 digit binary number from representing more than 4 GB worth of memory addresses. While one might expect then that the maximum available memory of a 32 bit operating system, such as Microsoft Windows 7, is 4 GB, in practice it is much lower. In fact, the maximum available memory available for Microsoft Windows 7 is typically around 3¼ GB.

The reason why a 32 bit operating system may be unable to make use of more than 3¼ GB of memory (even if more than 4 GB of memory is physically present within the hardware of the computer) is that a portion of the 4 GB addressable by a 32 bit operating system is reserved and unavailable to the operating system. For example, on a typical PC, about 500-700 megabytes (MB) of memory is generally allocated for the so-called PCI memory hole, which is a term used to describe the area of memory set aside for communication with or involving hardware components, such as PCI cards, resident on the computer.

Most personal computers available for purchase today contain more than 4 GB of memory. However, if a 32 bit version of Microsoft Windows 7 is run on a PC having more than 4 GB of memory, as explained above, the 32 bit version of Microsoft Windows 7 will be unable to use more than about 3¼ GB of memory. Consequently, certain 32 bit operating system, such as 32 bit versions of Microsoft Windows 7, may not be able to use all the available memory when running on modern computers.

The Intel hardware architecture supports a feature known as Physical Address Extension (PAE) which enables 32 bit x86 processors to access memory addresses above 4 GB, and introduces a security feature called "eXcute Disable" (XD). Even when the OS has configured the CPU to run in PAE mode, some hardware drivers may still be unable to handle addresses above 4 GB. As a result, Microsoft Corporation choose not to use memory addresses above 4 GB even when running in PAE mode on its 32 bit desktop operating systems.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for memory management performed by a hypervisor are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

FUNCTIONAL OVERVIEW

When a hypervisor executes on a device, the hypervisor assumes the responsibility of assigning memory to virtual machines upon their creation. Embodiments of the invention enable a hypervisor to manage the memory addressed above four gigabytes. By doing so, when the hypervisor instantiates a virtual machine, the hypervisor allocates memory pages for the virtual machine by preferentially using any unassigned memory addressed above four gigabytes prior to using unassigned memory addressed below four gigabytes. Advantageously, in situations where a device is executing a 32 bit operating system and possesses memory mapped above 4 GB, the hypervisor of an embodiment allows for memory mapped above 4 GB to be fully utilized.

Figure 1A:
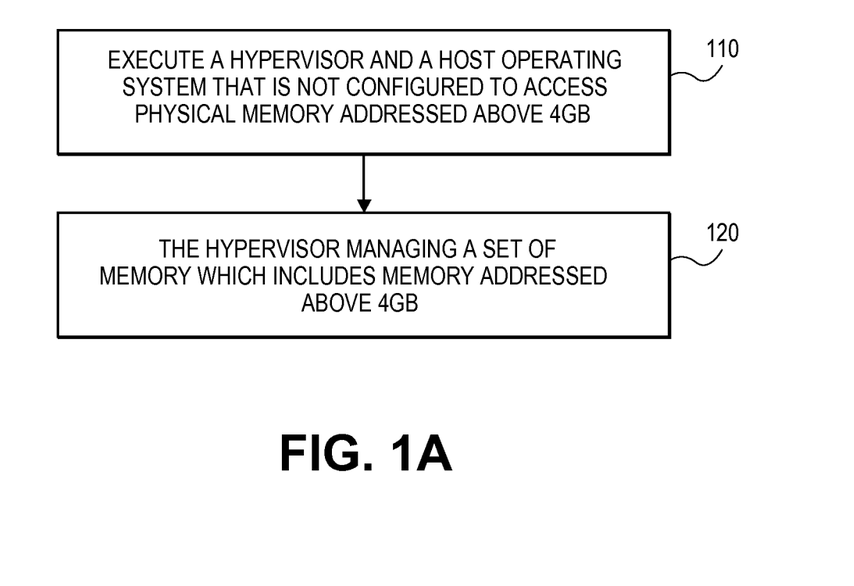
FIG. 1A is a flow diagram illustrating the steps of managing memory according to an embodiment of the invention.

FIG. 1A is a flow diagram illustrating the steps of managing memory according to an embodiment of the invention. The steps of FIG. 1A will be discussed in reference to FIG. 1B, which is a block diagram illustrating a device according to an embodiment of the invention.

Figure 1B:
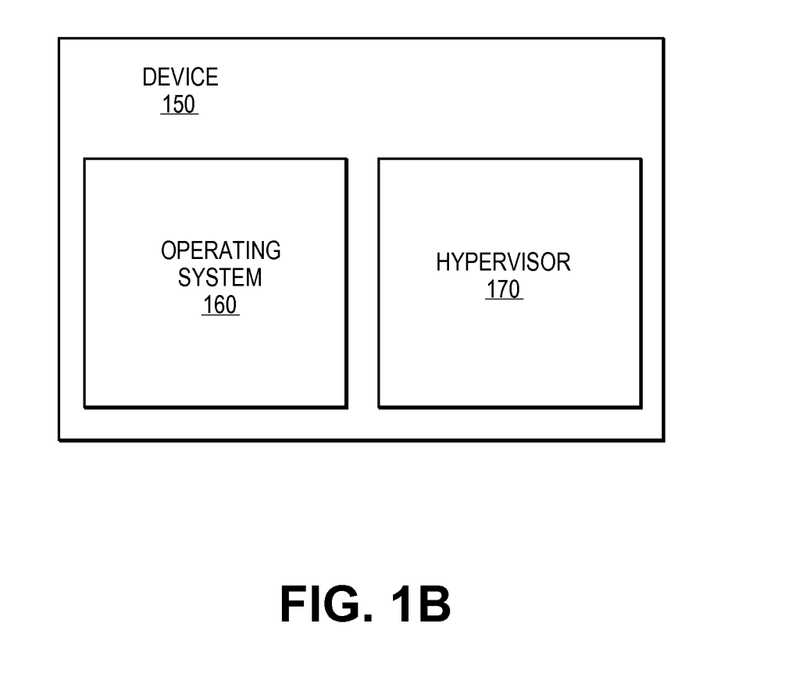
FIG. 1B is a block diagram illustrating a device according to an embodiment of the invention.

In step 110, host operating system 160 and hypervisor 170 execute on device 150. Device 150 broadly represents any type of device which may execute an operating system and a hypervisor. Non-limiting, illustrative examples of device 150 include a computer, a laptop computer, a tablet PC, a cell phone, a mobile device, or any other device containing at least one processor and memory for storing executable instructions.

Host operating system 160 broadly represents any type of operating system. Host operating system 160 may, but need not, be a 32 bit operating system. For example, host operating system 160 may be embodied as a 32 bit version of Microsoft Windows 7.

Hypervisor 170 may be embodied as a Type 2 hypervisor. In an embodiment, hypervisor 170 may be embodied as a Type 2 hypervisor which executes at a greater privilege than host operating system 160 (this special form of a Type 2 hypervisor shall be referred to herein as a "Type 1.5 hypervisor"). Type 1.5 hypervisors are explained in greater detail below in the section entitled "Preventing the Host from Accessing Hypervisor Resources."

In the normal course of operation, hypervisor 170 may instantiate one or more virtual machines on device 150. A virtual machine instantiated by hypervisor 170 may comprise a guest operating system, which may, but need not, be a 32 bit guest operating system, e.g., a 32 bit version of Microsoft Windows 7.

In an embodiment where hypervisor 170 is a Type 2 or a Type 1.5 hypervisor, the hardware of device 150 executes in Physical Address Extension (PAE) mode. PAE mode is a feature supported by certain architectures, such as the Intel® hardware architecture, which enables 32 bit x86 processors to process memory addresses mapped larger than 4 GB by using a multi-level page table. The multi-level page table enables 32 bit virtual addresses to be mapped to up to 64 GB of physical memory. Consequently, hypervisor 170 may use the multi-level page table to translate 32 bit addresses to memory mapped larger than 4 GB.

In an embodiment where hypervisor 170 is a Type 2 hypervisor, hypervisor 170 runs using the paging mode, and by extension the pages tables, of the host operating system. As a result, the host operating system is in control of the hardware mode, e.g., the hardware mode may be instructed to operate in PAE mode by the host operating system when the host operating system is a 32 bit version of Microsoft Windows 7 or XP SP2.

In an embodiment where hypervisor 170 is a Type 1.5 hypervisor, hypervisor 170 will have its own page tables and paging mode. The host operating system can configure the paging mode and the page tables of the virtual machine in which the host operating system is executing, but these page tables would be virtual rather than the real page tables used by the hardware. In most embodiments, a Type 1.5 hypervisor would be a 64 bit hypervisor regardless of whether the host operating system was a 32 or 64 bit operating system. Hence, hypervisor 170 may use a 4-level page table (PAE is 3-level).

In step 120, hypervisor 170 manages a set of memory for use running VMs. The set of memory which hypervisor 170 manages includes memory addressed above 4 GB. When hypervisor 170 is launched, hypervisor 170 may check firmware-created tables (which may be referred to as the "E820 table") to determine if there is any memory addressed above 4 GB. Other mechanisms may also be used to determine the physical memory layout of the machine to determine if there is any memory addressed above 4 GB, e.g., chipset registers may be interrogated, or probing of addresses may be performed. If there is any memory addressed above 4 GB which is not in use, then hypervisor 170 may use this memory for itself or may allocate the memory to a virtual machine instantiated by hypervisor 170.

When hypervisor 170 is instructed to instantiate a virtual machine, hypervisor 170 allocates memory pages for the virtual machine by preferentially using any unassigned memory addressed above four gigabytes before requesting further memory from the host operating system (which will be below four gigabytes). Thus, when instantiating a virtual machine, hypervisor 170 may allocate memory addressed below four gigabytes for the virtual machine, but may only do so once hypervisor 170 determines that there is no unassigned memory addressed above four gigabytes.

Note that the guest operating system executing within the newly instantiated virtual machine may be a 32 bit operating system, as none of the memory addresses provided to the guest operating system will be addressed above 4 GB (even if the memory is actually physically located at an address above 4 GB). This may accomplished using Extended Page Tables maintained by a Memory Management Unit (MMU) to map guest-physical addresses to host-physical addresses. In this case, the Extended Page Tables will map guest-physical addresses to memory pages addressed above 4 GB.

In an embodiment where hypervisor 170 is embodied as a Type 1.5 hypervisor that executes at a greater privilege than host operating system 160, upon deprivileging host operating system 160 to execute hypervisor 170 at a greater privilege than host operating system 160, a portion of unassigned memory addressed above four gigabytes may go on to be assigned to host operating system 160 by hypervisor 170. Note that the total amount of memory assigned to certain 32 bit operating systems, such as Microsoft Windows 7, will not change, but some of the pages may be mapped above four gigabytes using Extended Page Tables as described above.

Preventing the Host from Accessing Hypervisor Resources

Figure 2:
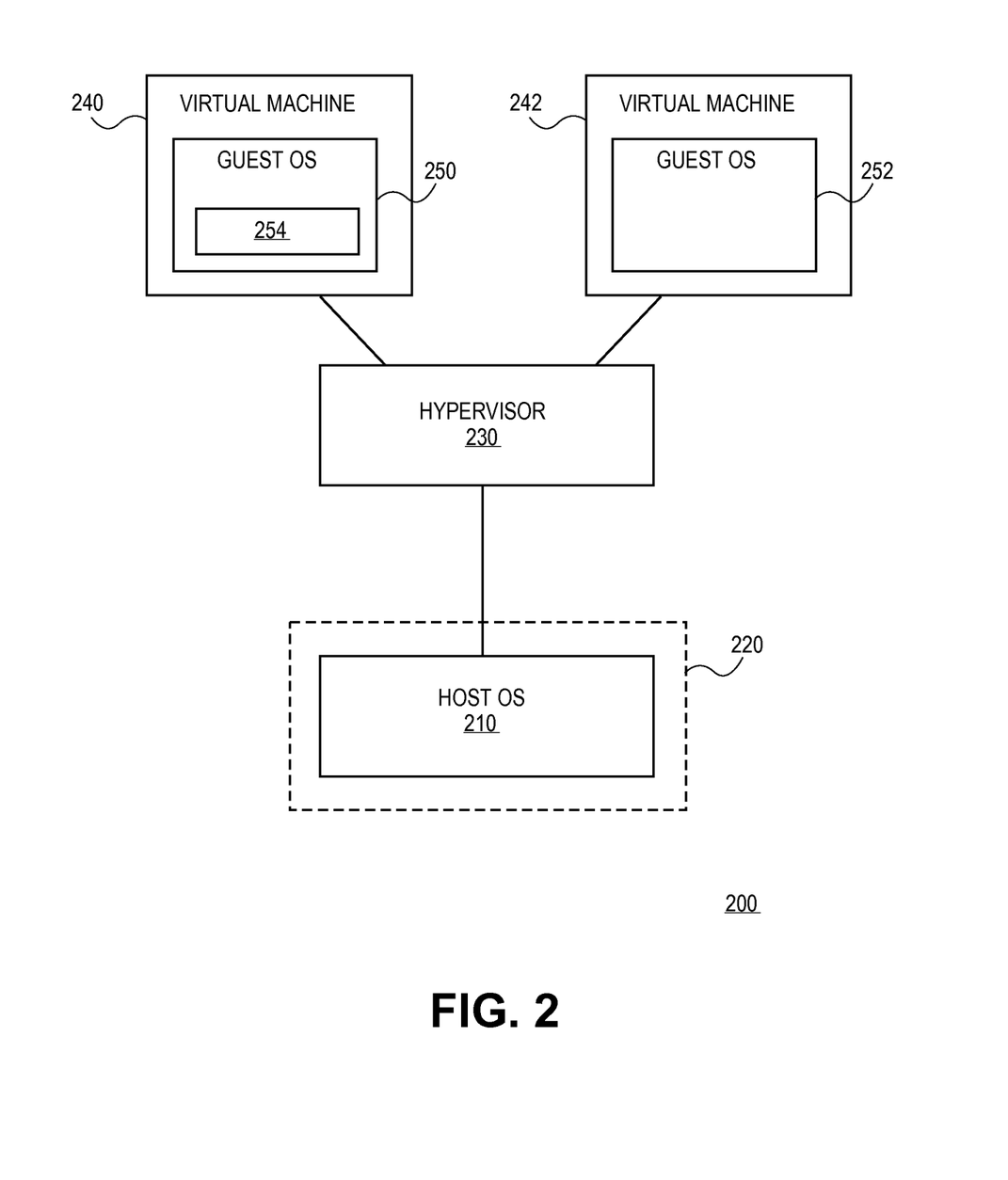
FIG. 2 is a block diagram illustrating a Type 2 hypervisor which may be used by an embodiment of the invention.

Embodiments of the invention may be used in conjunction with a Type 1.5 hypervisor. The operation of a Type 1.5 hypervisor according to an embodiment shall be described in further detail below with reference to FIG. 2. FIG. 2 is a block diagram illustrating an exemplary system 200 according to an embodiment of the invention. System 200 includes a set of software components, namely host operating system 210 (hereafter "host OS 210"), hypervisor 230, and virtual machines 240 and 242. The software components of system 200 may reside and operate on a wide variety of physical devices. For example, non-limiting, illustrative examples of the types of physical devices upon which system 200 may reside and operate include a personal computer (PC), a tablet PC, a laptop computer, a cell phone, a personal digital assistance (PDA), and the like.

Host OS 210 is intended to broadly represent any type of operating system which is capable of managing a set of resources. Hypervisor 230 is intended to broadly represent any type of hypervisor that executes within host OS 210. Hypervisors that execute within a host operating system may be referred to as Type 2 hypervisors; although, as shall be evident from the present teachings, hypervisor 230 of an embodiment operates differently than Type 2 hypervisors known in the art.

Hypervisor 230 is capable of creating and managing a plurality of different virtual machines (conventionally termed "guest operating systems") using the memory and other resources available to hypervisor 230. Guest operating systems within system 200 are intended to execute within a virtual machine. FIG. 2 depicts guest operating systems (hereafter simply guest OS) 250 and 252 which execute within virtual machines 240 and 242 respectively.

While FIG. 2 only depicts two virtual machines, it will be evident to those in the art that hypervisor 230 may create any number of virtual machines. Furthermore, hypervisor 230 may, at various times, de-allocate a particular virtual machine when it is no longer needed. Therefore, the number of virtual machines, and by extension the number of guest operating systems, within system 200 may vary over time and from implementation to implementation.

Resources, such as memory, access to the CPU, and access to an I/O device, may be assigned or allocated to hypervisor 230. Hypervisor 230, in turn, may allocate a certain portion of these resources to a virtual machine instantiated by hypervisor 230.

Each guest operating system may comprise one or more components that issue requests to perform operations (such as an I/O operation) to host OS 210 via hypervisor 230. FIG. 2 depicts an example of such components in guest OS 250 as device driver component 254. Device driver component 254 may require access to resources, such as access to a persistent storage, a network, or the CPU. Host OS 210 will process requests originating from device driver component 254 for access to resources. Device driver component 254 may, in certain embodiments, correspond to a paravirtual device driver that is designed specifically for a hypervisor environment or to a hardware device driver designed to communicate with a hardware component, which in a hypervisor environment communicates with an emulation of that hardware device.

In an embodiment, to prevent host OS 210 from accessing resources belonging to or allocated by hypervisor 230, execution of host OS 210 is transferred into virtual machine container 220. Virtual machine container 220, as broadly used herein, refers to any container, abstraction, or mechanism which may be used to enforce and manage access to a bounded area of memory. For example, virtual machine container 220 may be implemented as a VMCS container provided by certain Intel® hardware by an embodiment. Virtual machine container 220 is designed or configured to have insufficient privilege to access any portion of the set of memory pages in which hypervisor 230, or any virtual machine instantiated thereby, reside. Therefore, processes executing within virtual machine container 220 cannot access resources assigned to or allocated by hypervisor 230, but for certain exceptions discussed below.

Embodiments may employ different mechanisms to ensure that virtual machine container 220 lacks sufficient privilege to access resources allocated to or by hypervisor 230. One way for doing so is by removing reference to the set of memory pages in which hypervisor 230 resides from the Extended Page Tables (EPT) of host OS 210. Extended Page Tables are tables used by a Memory Management Unit (MMU) to map guest-physical addresses to host-physical addresses. Thus, in an embodiment, the Extended Page Tables of virtual machine container 220 allows host OS 210 to access the memory and other resources host OS 210 is supposed to possess, but not the memory and other resources belonging to or allocated by hypervisor 230. Hardware components, such as a MMU, may establish and enforce constraints on what portions of memory host OS 210 is allowed to access based on data within the Extended Page Tables.

Embodiments may take different approaches for establishing host OS 210 within virtual machine container 220. For example, in one embodiment, initially, host OS 210 boots. Thereafter, after booting host OS 210, host OS 210 is transferred into a virtual machine container 220 as they hypervisor starts. In a different approach, prior to booting host OS 210, a portion of machine memory is reserved such that the host OS 210 will not use it. Thereafter, the full hypervisor 230 is instantiated within the reserved portion of memory which host OS 210 cannot access.

In an embodiment, once host OS 210 is prevented from accessing any resources belonging to or allocated by hypervisor 230, devices under the control of host OS 210 are prevented from performing unauthorized direct memory accesses (DMA) to resources belonging to or allocated by hypervisor 230 by means of configuring the input/output memory management unit (IOMMU). Thus, the host OS 210 is responsible for allocating resources to the hypervisor 230, but having allocated such resources the hypervisor 230 configures the hardware to removes the host OS's ability to access such resources (thus ensuring the privacy and integrity of the hypervisor and any VMs the hypervisor goes on to assign those resources to). However, that is not to say that host OS 210, or devices under control of host OS 210, can never access the resources belonging to or allocated by hypervisor 230. Indeed, in the natural course of operation, hypervisor 230 will rely upon host OS 210 to perform certain activity, such as I/O operations, on behalf of hypervisor 230 and virtual machines 240 and 242.

To balance the need to have host OS 210 perform I/O operations for hypervisor 230 while minimizing the scope of access afforded to host OS 210, in embodiments of the invention, hypervisor 230 may provide host 210 temporary access to those memory pages involved in the performance of an operation (such as an I/O operation). Thereafter, hypervisor 230 may revoke access to those memory pages from host OS 210, presumably once the I/O operation has been performed. In this way, host OS 210 only has access to those memory pages necessary to perform the operations it has been requested to perform by hypervisor 230 or virtual machines 240 and 242.

To illustrate a concrete example, hypervisor 230 or virtual machines 240 and 242 may provide host OS 210 temporary access to a set of memory pages by granting a token to host OS 210. Thus, when host OS 210 performs an I/O operation it can present the token to the hypervisor 230 to facilitate the reading from or writing to the location of memory identified by the token as required by the requested operation.

Rather than providing a memory address to hypervisor 230 to identify a set of memory pages at which a requested operation is to be performed, host OS 210 need only provide a token. When host OS 210 wishes to read or write to a set of memory pages allocated to hypervisor 230, host OS 210 notifies hypervisor 230 that host OS 210 desires that a particular operation be performed against a set of memory pages and provides a token for those memory pages to hypervisor 230. If the token is valid, then hypervisor 230 will permit the read or write operation to the set of memory pages identified by the token. Hypervisor 230 will subsequently revoke the temporary permission to write to that location in memory from host OS 210 by causing the token to become invalid. If the token is invalid, then hypervisor 230 will not permit the operation to be performed by host OS 210.

If a guest operating system uses a paravirtual device driver, then the paravirutal device driver will make an explicit request to hypervisor 230 to allow host OS 210 access to a particular area of memory for purposes of performing IO operations. If the device driver component 254 is for a regular hardware device, then hypervisor 230 will have to parse the instructions given to device driver component 254 for the emulated hardware to identify the areas of memory in which the guest operating system is implicitly desiring IO operations to be performed against.

Ensuring the Privacy and Integrity of Hypervisor Memory

When hypervisor 230 or a guest OS desires an I/O operation to be performed, hypervisor 230 will ask host OS 210 to perform the I/O operation. As explained above, in doing so, hypervisor 230 will provide a token to host OS 210 so that host OS will have temporary access to a set of memory pages in which the I/O operation is to be performed. In an embodiment, either hypervisor 230 or a guest operating system may encrypt data before the data is provided to host OS 210 so that host OS 210 may perform an I/O operation using an encrypted version of the data rather than the original version. In this way, host OS 210 only has access to an encrypted version of the data and any programs executing within host OS 210 cannot inspect the encrypted version of the data. As a result, the privacy of hypervisor 230 and guest OSes is ensured since other components cannot inspect data written or read by hypervisor or VMs.

To illustrate using an embodiment where hypervisor 230 is responsible for encrypting the data, if hypervisor 230 instructs host OS 210 to write a page of memory to disk, then hypervisor 230 may encrypt the page of memory to create an encrypted version prior to requesting host OS 210 to write the page of memory to a persistent storage, such as a hard-disk drive (HDD) or solid state device (SSD). Note that a guest operating system executing within a virtual machine, such as guest OS 250 of virtual machine 240, may request hypervisor 230 to perform an I/O operation, and so hypervisor 230, in instructing host OS 210 to perform an I/O operation, may be acting on behalf of a virtual machine in system 200.

When hypervisor 230 requests host OS 210 to read into memory the page of memory from persistent storage, host OS 210 will read the encrypted page of memory into a location in memory using the token provided to host OS 210 by hypervisor 230.

In an embodiment, after hypervisor 230 revokes from host OS 210 access to the encrypted version of the page in memory, hypervisor 230 decrypts the encrypted version of the page of memory. If a virtual machine requested the performance of the read operation, then hypervisor 230 would then provide that virtual machine access to the page of memory.

In an alternate embodiment, after host OS 210 reads the encrypted page of memory into a set of memory pages, hypervisor 230 copies the encrypted version into a different location in memory to which the host OS 210 does not have permission to access. Hypervisor 230 may copy the encrypted version into the different location in memory either of its own initiative or at the direction of a guest operating system, or as a result of the host presenting a suitable token. Thereafter, hypervisor 230 decrypts the encrypted version of the page of memory at its present location. If a virtual machine requested the performance of the read operation, then hypervisor 230 would then provide that virtual machine access to the page of memory.

In an embodiment, hypervisor 230 may use a cryptographic checksum to ensure data outside the control of hypervisor 230 has not been tampered with. Using a cryptographic checksum, the integrity of resources belonging to or allocated by hypervisor 230 may be ensured. A cryptographic checksum is data that is computed using a set of input data and an algorithm to ensure that the input data has not been modified since the cryptographic checksum was calculated. Embodiments of the invention may employ a wide variety of approaches for obtaining a cryptographic checksum. Various entities may generate the cryptographic checksum, e.g., in some embodiments, hypervisor 230 may generate the cryptographic checksum while in other embodiments a guest operating system or other component may generate the cryptographic checksum and provide it to hypervisor 230. Embodiments of the invention may obtain a cryptographic checksum upon encrypted or unencrypted data.

To illustrate how a cryptographic checksum is used by an embodiment, consider an example involving hypervisor 230 instructing host OS 210 to write a page of memory to persistent storage. In an embodiment, hypervisor 230 generates a cryptographic checksum on a page of memory prior to providing host OS 230 access to the encrypted version of the page of memory. The cryptographic checksum will be used by hypervisor 230 to verify the integrity of the encrypted version of the page of memory. Embodiment of the invention may obtain the cryptographic checksum on the page of memory either before or after encrypting the page of memory. Host OS 210 may then write the cryptographic checksum to a persistent storage contemporaneous with writing the encrypted version of the page of memory to the persistent storage.

Advantageously, the hypervisor 230 may determine, using a cryptographic checksum, whether the integrity of the encrypted version of a page has been violated since leaving the custody of hypervisor 230. The cryptographic checksum may be retrieved by host OS 210 from the persistent storage on which the encrypted version of the data was stored. Host OS 210 may present the cryptographic checksum to hypervisor 230 along with the encrypted version of the data.

Reducing Memory

Hypervisor 230 may determine that it is necessary to reduce its memory consumption. Alternately, host OS 210 may request hypervisor 230 to reduce the amount of memory used by hypervisor 230. Hypervisor 230 will evict memory pages used by itself or a virtual machine to reduce the amount of memory consumed by hypervisor 230. When hypervisor 230 decides to evict a set of memory pages from a particular virtual machine, hypervisor 230 encrypts the set of memory pages and obtains a cryptographic checksum for the encrypted memory pages. Hypervisor 230 then instructs host OS 210 to persistently store the encrypted memory pages and the cryptographic checksum to a persistent storage. Thereafter, hypervisor may safely evict the set of memory pages from memory and reduce, if desired, an amount of memory allocated to hypervisor 230, and thus return the page to the host.

When hypervisor 230 decides to read a set of evicted memory pages back into the memory of a particular virtual machine, hypervisor 230 instructs host OS 210 to read the memory pages (which will be encrypted) and a cryptographic checksum from a persistent storage. Hypervisor 230 verifies the integrity of the encrypted memory pages using the cryptographic checksum, and decrypts the encrypted memory pages. Hypervisor 230 may then provide access to the decrypted memory pages to the particular virtual machine.

Hardware Mechanisms

Figure 3:
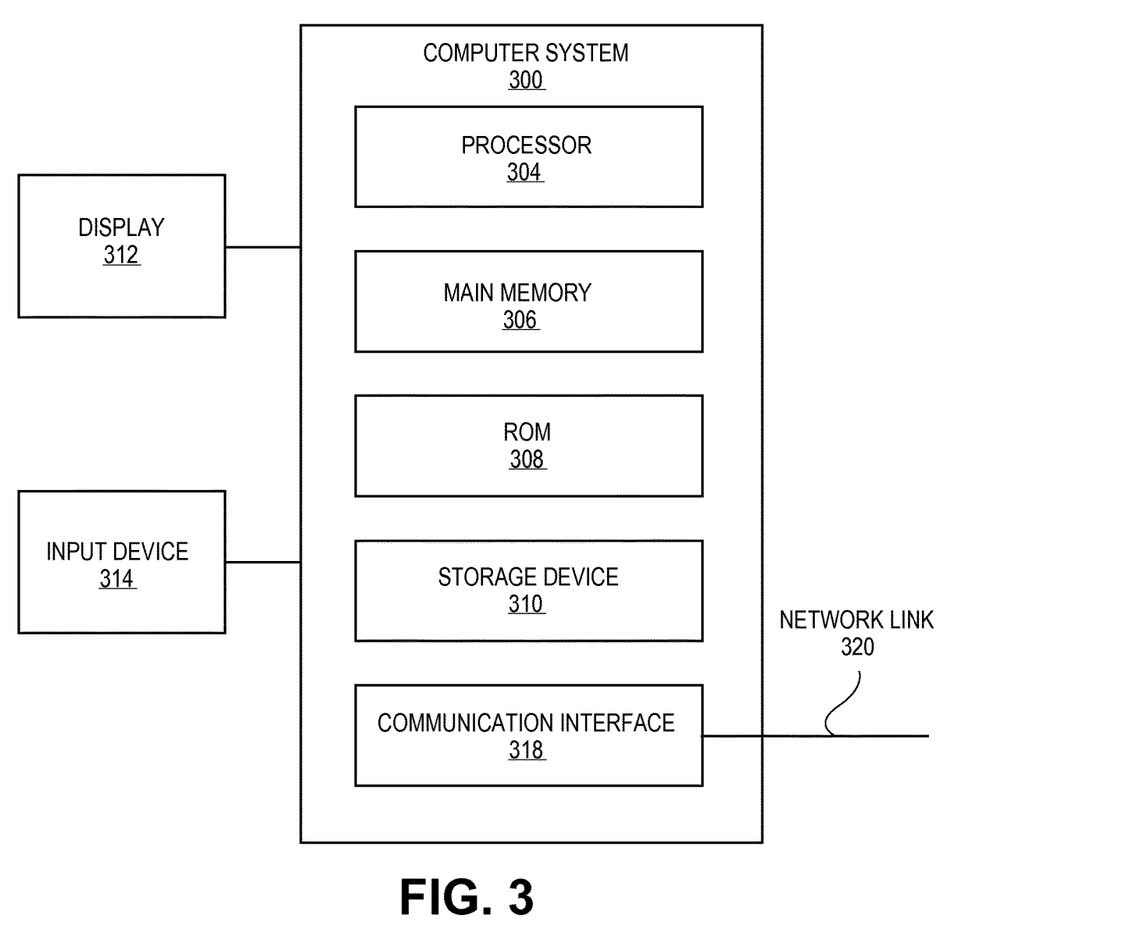
FIG. 3 is a block diagram that illustrates a computer system upon which an embodiment of the invention may be implemented.

In an embodiment, system 100 of FIG. 1 may be implemented on a computer system. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that tangibly stores one or more sequences of instructions for performing memory management by a hypervisor, which when executed by one or more processors, cause:
    executing, on a device, a host operating system and the hypervisor, wherein the host operating system is not configured to access physical memory addressed above four gigabytes, and
    wherein the hypervisor executes on the host operating system;
    the hypervisor managing a set of memory to be used by the hypervisor or by virtual machines instantiated by the hypervisor, wherein the set of memory includes memory addressed above four gigabytes, and
    upon the hypervisor being instructed to instantiate a virtual machine, the hypervisor allocating memory pages for the virtual machine by preferentially using any unassigned memory addressed above four gigabytes before using memory allocated from the host, wherein all memory allocated from the host is below four gigabytes.

2. The non-transitory computer-readable storage medium of claim 1, wherein the host operating system is a 32 bit operating system.

3. The non-transitory computer-readable storage medium of claim 1, wherein a guest operating system executing within the virtual machine is a 32 bit operating system.

4. The non-transitory computer-readable storage medium of claim 1, wherein the hypervisor executes at a greater privilege than the host operating system.

5. The non-transitory computer-readable storage medium of claim 1, wherein execution of the one or more sequences of instructions further causes:
upon deprivileging the host operating system to execute the hypervisor at a greater privilege than the host operating system, assigning a portion of unassigned memory addressed above four gigabytes to the host operating system.

6. An apparatus for performing memory management by a hypervisor, comprising:
one or more processors; and
a non-transitory computer-readable medium tangibly storing one or more sequences of instructions, which when executed by the one or more processors, cause:
executing, on a device, a host operating system and the hypervisor, wherein the host operating system is not configured to access physical memory addressed above four gigabytes, and
wherein the hypervisor executes on the host operating system;
the hypervisor managing a set of memory to be used by the hypervisor or by virtual machines instantiated by the hypervisor, wherein the set of memory includes memory addressed above four gigabytes; and
upon the hypervisor being instructed to instantiate a virtual machine, the hypervisor allocating memory pages for the virtual machine by preferentially using any unassigned memory addressed above four gigabytes before using memory allocated from the host, wherein all memory allocated from the host is below four gigabytes.

7. The apparatus of claim 6, wherein the host operating system is a 32 bit operating system.

8. The apparatus of claim 6, wherein a guest operating system executing within the virtual machine is a 32 bit operating system.

9. The apparatus of claim 6, wherein the hypervisor executes at a greater privilege than the host operating system.

10. The apparatus of claim 6, wherein execution of the one or more sequences of instructions further causes:
upon deprivileging the host operating system to execute the hypervisor at a greater privilege than the host operating system, assigning a portion of unassigned memory addressed above four gigabytes to the host operating system.

11. A method for performing memory management by a hypervisor, comprising:
executing, on a device, a host operating system and the hypervisor, wherein the host operating system is not configured to access physical memory addressed above four gigabytes, and
wherein the hypervisor executes on the host operating system;
the hypervisor managing a set of memory to be used by the hypervisor or by virtual machines instantiated by the hypervisor, wherein the set of memory includes memory addressed above four gigabytes; and
upon the hypervisor being instructed to instantiate a virtual machine, the hypervisor allocating memory pages for the virtual machine by preferentially using any unassigned memory addressed above four gigabytes before using memory allocated from the host, wherein all memory allocated from the host is below four gigabytes.

12. The method of claim 11, wherein the host operating system is a 32 bit operating system.

13. The method of claim 11, wherein a guest operating system executing within the virtual machine is a 32 bit operating system.

14. The method of claim 11, wherein the hypervisor executes at a greater privilege than the host operating system.

15. The method of claim 11, further comprising:
upon deprivileging the host operating system to execute the hypervisor at a greater privilege than the host operating system, assigning a portion of unassigned memory addressed above four gigabytes to the host operating system.

* * * * *